United States Patent
Chang et al.

(10) Patent No.: US 10,747,959 B2
(45) Date of Patent: *Aug. 18, 2020

(54) DIALOG GENERATION METHOD, APPARATUS, AND ELECTRONIC DEVICE

(71) Applicant: Alibaba Group Holding Limited, George Town, Grand Cayman (KY)

(72) Inventors: Xiaofu Chang, Zhejiang (CN); Linlin Chao, Zhejiang (CN); Peng Xu, San Mateo, CA (US); Xiaolong Li, Zhejiang (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,995

(22) Filed: Jan. 31, 2020

(65) Prior Publication Data
US 2020/0167528 A1    May 28, 2020

Related U.S. Application Data

(63) Continuation of application No. 16/704,358, filed on Dec. 5, 2019, which is a continuation of application No. PCT/CN2018/090138, filed on Jun. 6, 2018.

(30) Foreign Application Priority Data

Jun. 7, 2017  (CN) .......................... 2017 1 0423859

(51) Int. Cl.
*G06F 40/30*     (2020.01)
*G06N 20/00*     (2019.01)

(52) U.S. Cl.
CPC ............. *G06F 40/30* (2020.01); *G06N 20/00* (2019.01)

(58) Field of Classification Search
CPC ...................................................... G06F 40/35
See application file for complete search history.

(56) References Cited

U.S. PATENT DOCUMENTS 7,664,644 B1    2/2010  Tur
2012/0101965 A1*  4/2012  Hennig ................ G06N 7/005
                                               706/12
(Continued)

FOREIGN PATENT DOCUMENTS

CN    103544337 A    1/2014
CN    106383815 A    2/2017
(Continued)

OTHER PUBLICATIONS

Ghosh, Shalini, et al. "Contextual lstm (clstm) models for large scale nlp tasks." arXiv preprint arXiv:1602.06291. (Year: 2016).*

(Continued)

*Primary Examiner* — Jialong He
(74) *Attorney, Agent, or Firm* — Finnegan, Henderson, Farabow, Garrett & Dunner, L.L.P.

(57) ABSTRACT

A dialog generation method includes: training a sequence to sequence (seq2seq)-based dialog model using a loss function including topic range constraint information; and generating a dialog using the trained dialog model. With the dialog generation method, topic range constraint information is introduced in the process of dialog model training using a loss function including the topic range constraint information, thus helping to prevent the trained model from producing low-quality meaningless replies.

9 Claims, 6 Drawing Sheets

(56) References Cited

U.S. PATENT DOCUMENTS

| | | | |
|---|---|---|---|
| 2013/0325483 | A1 | 12/2013 | Tzirkel-Hancock et al. |
| 2016/0110343 | A1* | 4/2016 | Kumar Rangarajan Sridhar ........ G10L 25/30 704/9 |
| 2016/0329047 | A1 | 11/2016 | Tur |
| 2016/0379106 | A1 | 12/2016 | Qi et al. |
| 2017/0046625 | A1 | 2/2017 | Takaai |
| 2017/0352347 | A1* | 12/2017 | Sharma ................. G06F 40/284 |
| 2018/0060301 | A1* | 3/2018 | Li ........................... G06F 40/35 |
| 2018/0137854 | A1* | 5/2018 | Perez ...................... G10L 15/22 |
| 2018/0157638 | A1* | 6/2018 | Li ........................... G10L 15/22 |

FOREIGN PATENT DOCUMENTS

| | | |
|---|---|---|
| CN | 106682734 A | 5/2017 |
| CN | 106997375 A | 8/2017 |

OTHER PUBLICATIONS

Asri, Layla El, Jing He, and Kaheer Suleman. "A sequence-to-sequence model for user simulation in spoken dialogue systems." arXiv preprint arXiv:1607.00070. (Year: 2016).*

Extended Search Report for European Application No. 18814267.3 from the European Patent Office, dated Mar. 9, 2020.

International Search Report for International Application No. PCT/CN2018/090138, dated Aug. 31, 2018.

* cited by examiner

US 10,747,959 B2

DIALOG GENERATION METHOD, APPARATUS, AND ELECTRONIC DEVICE

CROSS-REFERENCE TO RELATED APPLICATIONS

This application is a continuation application of U.S. application Ser. No. 16/704,358, filed on Dec. 5, 2019, which is a continuation application of International Application No, PCT/CN2018/090138, filed on Jun. 6, 2018, which is based upon and claims priority to Chinese Patent Application No. 201710423859.7, filed on Jun. 7, 2017, the entire content of all of which is incorporated herein by reference.

TECHNICAL FIELD

This application relates to the field of computer technologies, and in particular, to a dialog generation method, apparatus, and electronic device.

TECHNICAL BACKGROUND

With the rapid development of mobile devices, smart assist related applications have become increasingly common. For example, an increasingly popular dialog assistant can dialogue with a user based on voice, text, or other forms to answer questions raised by the user, or simply chat with the user.

In the prior art, questions and answers in a dialog process are regarded as mapping of a question language symbol sequence to an answer language symbol sequence, and a sequence to sequence (seq2seq)-based dialog model is trained using a large amount of manual dialog data with the maximum likelihood estimation as a loss function, so that the dialog model learns a mapping relationship between the question language symbol sequence and the answer language symbol sequence, and dialogs can be automatically generated by the trained dialog model, thereby implementing the dialog assistant.

However, the prior art is susceptible to high frequency reply statements without topic information such as "ok," "yes," and "got it" during the model training, resulting in a tendency to produce these low-quality meaningless replies when the trained model is actually used.

SUMMARY

A dialog generation method, apparatus, and electronic device are provided in embodiments of the specification, for solving the following technical problem: the prior art is susceptible to high frequency reply statements without topic information during dialog model training, resulting in a tendency to produce low-quality meaningless replies when the trained model is actually used.

In one aspect, a dialog generation method comprises: training a seq2seq-based dialog model using a loss function including topic range constraint information; and generating a dialog using the trained dialog model.

In another aspect, a dialog generation device comprises: at least one processor; and a memory connected with the at least one processor, wherein the memory stores an instruction executable by the at least one processor, and when executed by the at least one processor, the instruction causes the electronic device to: train a seq2seq-based dialog model using a loss function including topic range constraint information; and generate a dialog using the trained dialog model.

In still another aspect, a non-transitory computer-readable storage medium has stored therein instructions that, when executed by a processor of a device, cause the device to perform a dialog generation method comprising: training a seq2seq-based dialog model using a loss function including topic range constraint information; and generating a dialog using the trained dialog model.

The technical solutions adopted in the embodiments can achieve the following beneficial effects: topic range constraint information is introduced in the process of dialog model training using a loss function including the topic range constraint information, thus helping to prevent the trained model from producing low-quality meaningless replies. Therefore, the problem in the prior art can be partially or wholly solved.

BRIEF DESCRIPTION OF THE DRAWINGS

The accompanying drawings, which are incorporated in and constitute a part of this specification, illustrate embodiments and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the specification. Instead, they are merely exemplary.

Embodiments of the specification provide a dialog generation method, apparatus, and electronic device. In the dialog generation method, a seq2seq-based dialog model is trained using a loss function including topic range constraint information based on topic reply consistency, thus preventing the trained model from producing a low-quality meaningless dialog. The topic range constraint information may be at least part of a formula included in the loss function, and the at least part of the formula is also referred to as a topic range constraint function.

The topic reply consistency mainly refers to that, in a real human conversation, dialog topics of participants are often the same or related, and a topic range of reply statements is also limited correspondingly. For example, A mentions a weather-related topic, and it is reasonable for B to reply with a statement of the weather-related topic. Generally, B will not reply with content that has nothing to do with the weather-related topic, such as "what about this mobile phone?"

A dialog model is generally configured to simulate dialogs between real people as users, and thus it will be a better experience for users if the dialog model can generate a dialog following the topic reply consistency.

Figure 1:
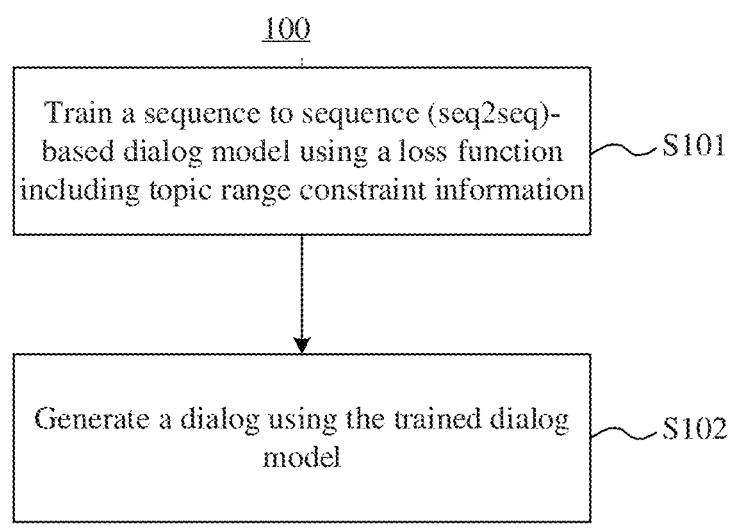
FIG. 1 is a flowchart of a dialog generation method according to an embodiment.

FIG. 1 is a flowchart of a dialog generation method 100 according to an embodiment. For example, the method 100 may be implemented by a program on a server or a terminal, such as a model training program, a dialog assistant application, an instant messaging application, and the like. Also example, the method 100 may be executed by at least one of the following devices that can serve as a server or a terminal: a mobile phone, a tablet computer, a smart wearable device, an on-board computer, a personal computer, a medium computer, a computer cluster, and the like. Referring to FIG. 1, the method 100 may include the following steps.

In step S101, a sequence-to-sequence (seq2seq)-based dialog model is trained using a loss function including topic range constraint information.

In the embodiment, the topic range constraint information may be one or more parameters related to a dialog topic in the loss function, or may be at least part of a formula related to the topic in the loss function.

In a training process of the dialog model, parameters in the dialog model are adjusted according to a loss calculated based on the loss function, and the topic range constraint information included in the loss function also has corresponding influence on adjustment of the parameters in the dialog model, such that the content of an output sequence of the trained dialog model is also constrained accordingly.

For example, this constraint may have two effects: firstly, the output sequence is enabled to include topic information, rather than a low-quality meaningless dialog; and secondly, the output sequence is enabled to achieve topic reply consistency with an input sequence of the corresponding dialog model.

In step S102, a dialog is generated using the trained dialog model.

In the embodiment, step S102 may be an operation in the process of dialog model training, or an operation after completion of the dialog model training.

For example, the trained dialog model is applied to a dialog assistant application. The dialog model receives a statement input by a user and outputs a reply statement; or the dialog model may output a reply statement based on a preset or automatically generated input statement; or the dialog model may directly output a preset statement without depending on an input statement; and so on.

The operations involved in FIG. 1 may be performed by the same device or program, or by different devices or programs. For example, steps S101 to S102 are both performed by the dialog assistant application. For another example, step S101 is performed by a model training program, and step S102 is performed by the dialog assistant application; and so on.

With the method 100, topic range constraint information is introduced in the process of dialog model training using a loss function including the topic range constraint information, thus helping to prevent the trained model from producing low-quality meaningless replies. Therefore, the problem in the prior art can be partially or wholly solved.

Figure 2:
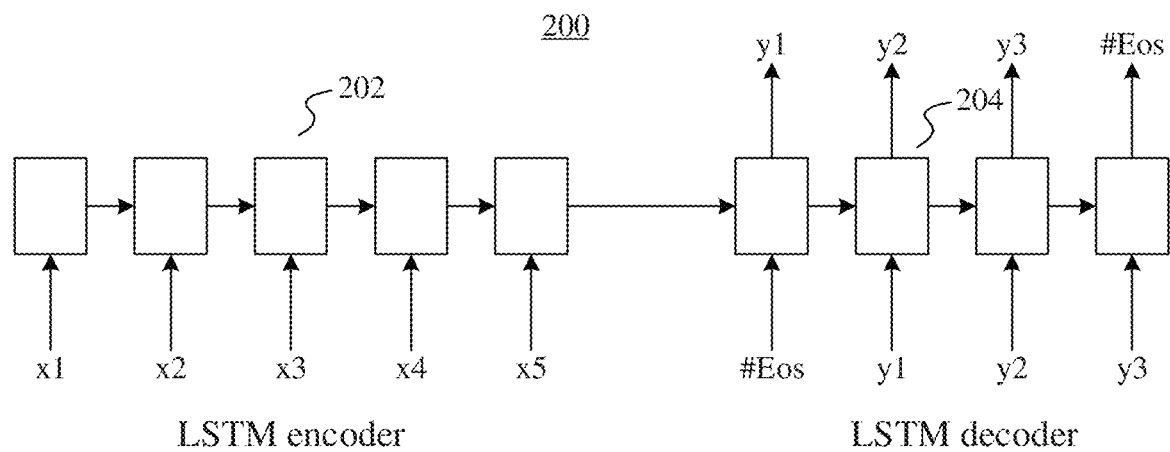
FIG. 2 is a schematic diagram of a seq2seq-based dialog model according to an embodiment.

FIG. 2 is a schematic diagram of a seq2seq-based dialog model 200, according to an embodiment.

The dialog model 200 may include first and second Long Short-Term Memory (LSTM) recurrent neural networks 202 and 204. The first LSTM network 202 is used as an encoder for processing an input dialog word sequence X, such as {x1, x2, x3, x4, x5}, and the second LSTM network 204 is used as a decoder for generating a reply word sequence Y, such as {y1, y2, y3}. For example, each of x1, x2, x3, x4, and x5 may represent a character or word in a sentence, and each of y1, y2, and y3 may represent a character or word in a reply to the sentence. Also for example, "Eos" (End of sequence) may represent a symbol indicating an end of a sequence. In an actual application, a loss function (i.e., an objective function) of the seq2seq-based dialog model 200 may adopt a Maximum Likelihood Estimate (MLE), as shown in the following Formula 1:

$$\text{Cost} = \log p(Y|X); \quad \text{Formula 1.}$$

In the embodiment, a topic range constraint function may be added to Formula 1, and then used for training the dialog model 200. In other embodiments where the MLE is not adopted, Formula 1 can be replaced correspondingly. Illustration is made with reference to FIG. 3 still by taking the MLE as an example.

Figure 3:
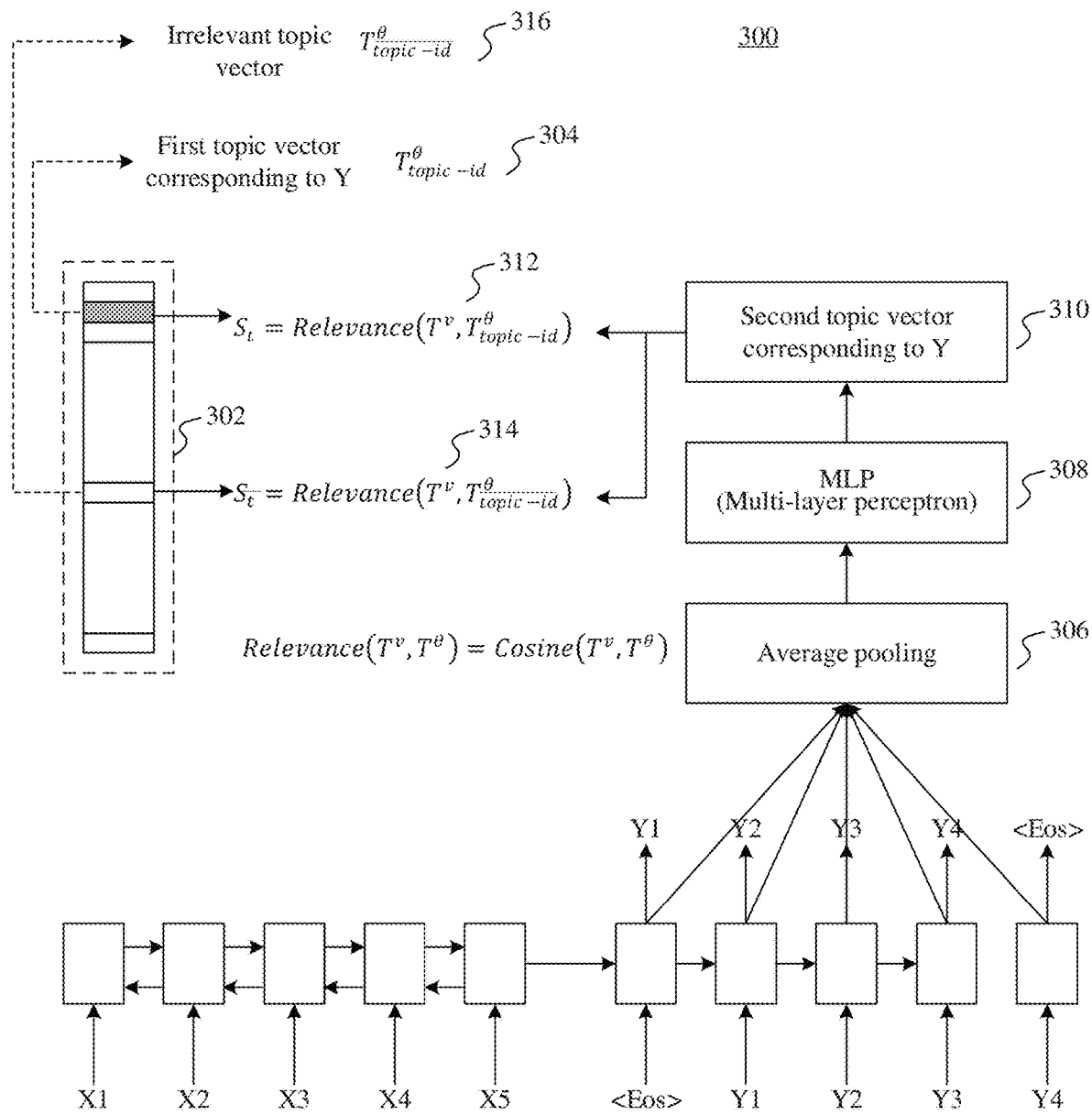
FIG. 3 is a schematic diagram of a dialog model training method according to an embodiment.

FIG. 3 is a schematic diagram of a dialog model training method 300, according to an embodiment. As can be seen, compared with FIG. 2, the topic range constraint function and a corresponding loss calculation are added in FIG. 3.

Figure 4:
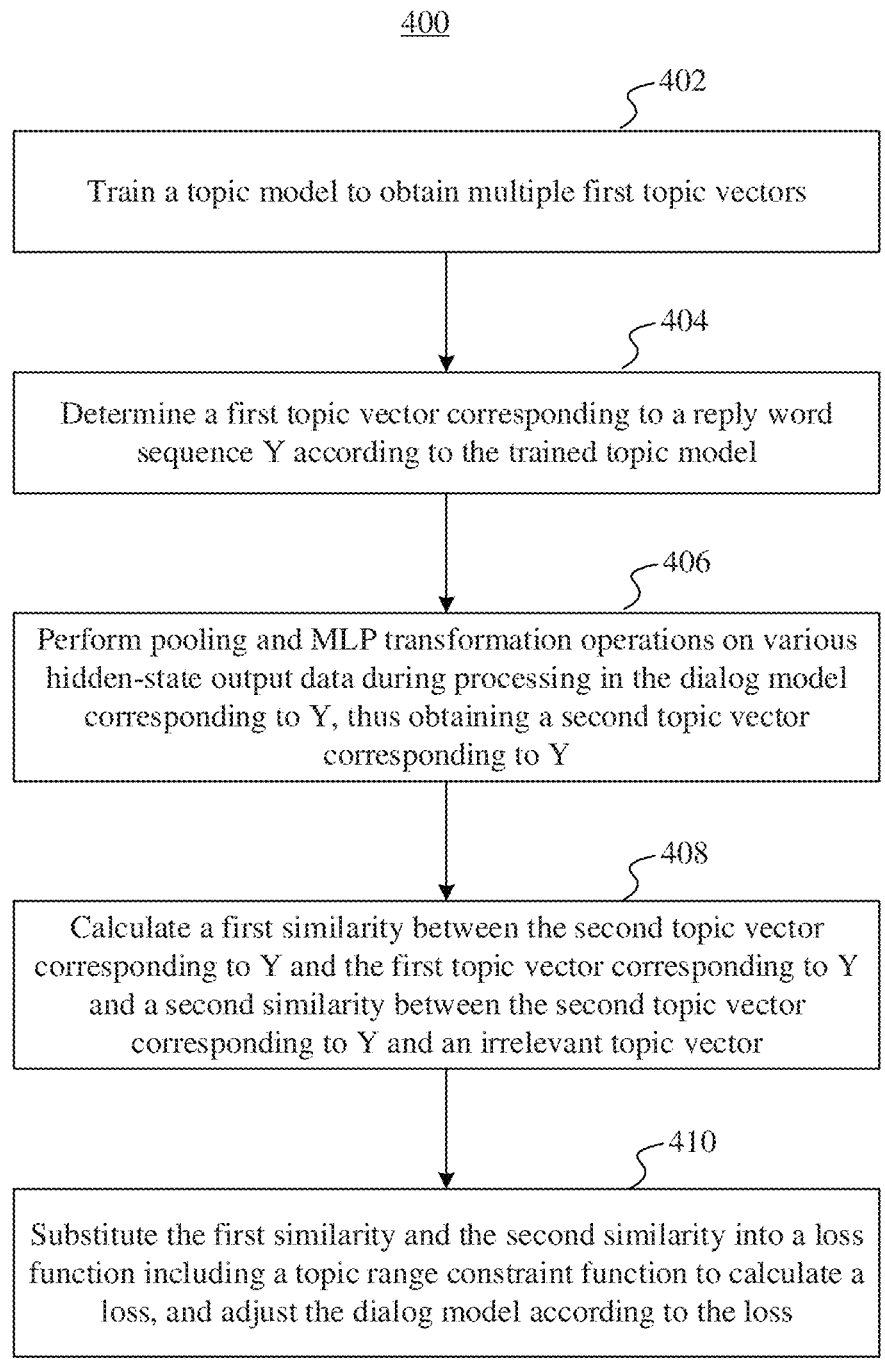
FIG. 4 is a flowchart of a dialog model training method according to an embodiment.

FIG. 4 is a flowchart of the dialog model training method 300 (FIG. 3) according to an embodiment. Referring to FIGS. 3 and 4, the method 300 may include the following steps.

In step 402, a topic model is trained to obtain multiple first topic vectors 302.

In step 404, a first topic vector 304 (denoted as: $T_{topic\text{-}id}^{\theta}$) corresponding to a reply word sequence Y is determined according to the trained topic model.

In step 406, operations of pooling, such as average pooling 306, and a multi-layer perceptron (MLP) transformation 308 are performed on various hidden-state output data during processing in the dialog model corresponding to Y, thus obtaining a second topic vector 310 (denoted as: $T^V$) corresponding to Y. For example, an MLP is a class of artificial neural network. An MLP may include three layers of nodes: an input layer, a hidden layer, and an output layer. Also for example, a hidden state of an item (e.g., character, word, etc.) in a sequence may be used to encode/decode a next item (e.g., next character, word, etc.) in the sequence. In some embodiments, existing MLP transformation techniques may be used in step 406.

In step 408, a first similarity 312 (denoted as: $S_t = \text{Relevance}(T^V, T_{topic\text{-}id}^{\theta})$) between the second topic vector corresponding to Y and the first topic vector 304 corresponding to Y and a second similarity 314 (denoted as: $S_t = \text{Relevance}(T^V, T_{\overline{topic\text{-}id}}^{\theta})$) between the second topic vector corresponding to Y and an irrelevant topic vector 316 (denoted as: $T_{\overline{topic\text{-}id}}^{\theta}$) are calculated, where Relevance( ) denotes a similarity calculation function, such as a cosine similarity function Cosine( ).

In step 410, the first similarity 312 and the second similarity 314 are substituted into the loss function including the topic range constraint function to calculate a loss, and the dialog model is adjusted according to the loss.

Further illustration is made as follows.

First, a topic model is trained in an unsupervised manner using a dialog training corpus. The topic model may be, for example, a Latent Dirichlet Allocation (LDA) model, a Kmeans model, or the like. The dialog training corpus may be a set of dialogs, e.g., collected from real conversations. By training the topic model, multiple topics can be extracted from the dialog training corpus, and multiple topic vectors are generated correspondingly, which are referred to as first topic vectors 302 each representing a topic. Topic IDs can be used to identify the first topic vectors 302. In some embodiments, the first topic vector may be a dense vector similar to word embedding, wherein the word embedding refers to converting a word into a word vector.

Then, according to the trained topic model, a first topic vector 304 corresponding to the reply word sequence Y can be obtained. Assuming that there is only one central meaning in one sentence, Y only corresponds to one topic ID, and corresponds to only one first topic vector correspondingly.

After that, hidden-state output data of Y during each step of the LSTM modeling is input for average pooling 306, and then transformed by the MLP 308 to obtain another topic vector expression of Y, which is referred to as a second topic vector 310 corresponding to Y. The MLP may be a multi-layer neural network, such as fully connected Deep Neural Networks (DNNs), etc.

It can be considered that the second topic vector 310 corresponding to Y should be similar to the first topic vector 304 corresponding to Y in the semantic space, compared to a first topic vector 316 corresponding to another irrelevant topic ID. Based on such consideration, a loss function including topic range constraint information is defined and, for example, is shown in Formula 2 below:

$$\text{Cost}'=\log p(Y|X)+\lambda*\log(1+e^{-(S_t-S_{\bar{t}})});\quad\text{Formula 2,}$$

where λ is a weight coefficient, $S_t$ represents a similarity between the second topic vector 310 corresponding to Y and the first topic vector 304 corresponding to Y, and $S_{\bar{t}}$ represents a similarity between the second topic vector 310 corresponding to Y and an irrelevant topic vector 316. The irrelevant topic vector 316 is a vector among the first topic vectors 302 other than the first topic vector 304 corresponding to Y, and a topic corresponding to the irrelevant topic vector is irrelevant to the topic corresponding to Y.

The similarity may be, for example, a cosine similarity, or data that can measure the similarity between vectors, such as a distance between vectors.

Finally, based on Formula 2, the corresponding loss may be calculated and the dialog model may be adjusted. As a result, the dialog model can be repeatedly trained using multiple training samples until the training converges.

It should be noted that the implementation in FIG. 3 is only exemplary. Based on the method 300, some steps involved in the training in the method 100 (FIG. 1) are further illustrated below.

In the method 100, a step of training a topic model using a dialog training corpus to obtain multiple first topic vectors each representing a topic may be further performed before the step S101 of training the seq2seq-based dialog model.

In the example of FIG. 3, the topic model is trained in an unsupervised manner, which is advantageous in that the training can be efficiently performed with a large amount of dialog training corpus, without the need of manually adding topic labels to the dialog training corpus. Therefore, the cost can be reduced and it is not easy to miss topics. The topic model may also be trained in a supervised manner.

In the method 100, the step S101 of training the seq2seq-based dialog model using the loss function including the topic range constraint information may include: inputting a training sequence into the seq2seq-based dialog model for processing to obtain various hidden-state output data output during the processing and an output sequence obtained after the processing: generating a second topic vector corresponding to the output sequence according to the various hidden-state output data; inputting the output sequence into the trained topic model for processing to obtain a first topic vector corresponding to the output sequence among the multiple first topic vectors; calculating a loss using the loss function including topic range constraint information according to the first and second topic vectors corresponding to the output sequence; and adjusting the dialog model according to the loss.

In the example of FIG. 3, the training sequence is X, and the output sequence is Y.

Further, the generating a second topic vector corresponding to the output sequence according to the various hidden-state output data may have a variety of specific implementation manners.

For example, the manner in the example of FIG. 3 is: pooling the various hidden-state output data; and inputting data obtained after the pooling into an MLP for processing to obtain the second topic vector corresponding to the output sequence. The pooling takes average pooling as an example, without excluding the possibility of using another pooling manner other than the average pooling.

In addition, the various hidden-state output data may be mapped in another set mapping manner other than using the MLP to obtain the second topic vector corresponding to the output sequence.

Further, the calculating a loss using the loss function including topic range constraint information according to the first and second topic vectors corresponding to the output sequence may include: calculating a first similarity between the second topic vector corresponding to the output sequence and the first topic vector corresponding to the output sequence; calculating a second similarity between the second topic vector corresponding to the output sequence and an irrelevant topic vector, wherein the irrelevant topic vector is a vector in the multiple first topic vectors other than the first topic vector corresponding to the output sequence; and substituting the first similarity and the second similarity into the loss function including topic range constraint information to calculate the loss, wherein the topic range constraint information is a formula including parameters corresponding to the first similarity and the second similarity.

In the example of FIG. 3, the parameter corresponding to the first similarity is $S_t$, the parameter corresponding to the second similarity is $S_{\bar{t}}$, the loss function including the topic range constraint information is Formula 2, and the topic range constraint information is $\lambda*\log(1+e^{-(S_t-S_{\bar{t}})})$.

It should be noted that Formula 2 is exemplary, and other loss functions including the topic range constraint information other than Formula 2 may be constructed based on the parameters $S_t$ and/or $S_{\bar{t}}$. In general, for the topic range constraint information including the parameters $S_t$ and $S_{\bar{t}}$, the greater $S_t$ is compared with $S_{\bar{t}}$, the smaller the loss portion corresponding to the topic range constraint information in the calculated loss is.

Figure 5:
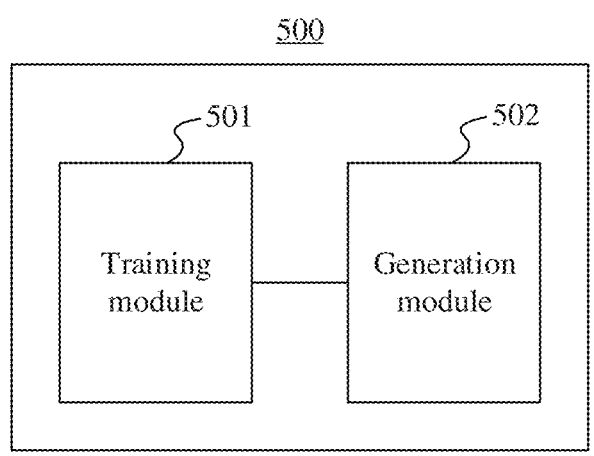
FIG. 5 is a block diagram of a dialog generation apparatus according to an embodiment.

FIG. 5 is a block diagram of a dialog generation apparatus 500 corresponding to the method 100 (FIG. 1), according to an embodiment. The apparatus 500 may include: a training module 501 training a seq2seq-based dialog model using a loss function including topic range constraint information; and a generation module 502 generating a dialog using the trained dialog model.

In some embodiments, before training the seq2seq-based dialog model, the training module 501 further trains a topic model using a dialog training corpus to obtain multiple first topic vectors each representing a topic.

In some embodiments, the training module 501 training a seq2seq-based dialog model using a loss function including topic range constraint information includes: the training module 501 inputting a training sequence into the seq2seq-based dialog model for processing to obtain various hidden-state output data output during the processing and an output sequence obtained after the processing; generating a second topic vector corresponding to the output sequence according to the various hidden-state output data; inputting the output sequence into the trained topic model for processing to obtain a first topic vector corresponding to the output sequence among the multiple first topic vectors; calculating a loss using the loss function including topic range constraint information according to the first and second topic vectors corresponding to the output sequence; and adjusting the dialog model according to the loss.

In some embodiments, the training module 501 generating a second topic vector corresponding to the output sequence according to the various hidden-state output data includes: the training module 501 pooling the various hidden-state output data; and inputting data obtained after the pooling into an MLP for processing to obtain the second topic vector corresponding to the output sequence.

In some embodiments, the training module 501 calculating a loss using the loss function including topic range constraint information according to the first and second topic vectors corresponding to the output sequence includes: the training module 501 calculating a first similarity between the second topic vector corresponding to the output sequence and the first topic vector corresponding to the output sequence; calculating a second similarity between the second topic vector corresponding to the output sequence and an irrelevant topic vector, wherein the irrelevant topic vector is a vector in the multiple first topic vectors other than the first topic vector corresponding to the output sequence; and substituting the first similarity and the second similarity into the loss function including topic range constraint information to calculate the loss, wherein the topic range constraint information is a formula including parameters corresponding to the first similarity and the second similarity.

Figure 6:
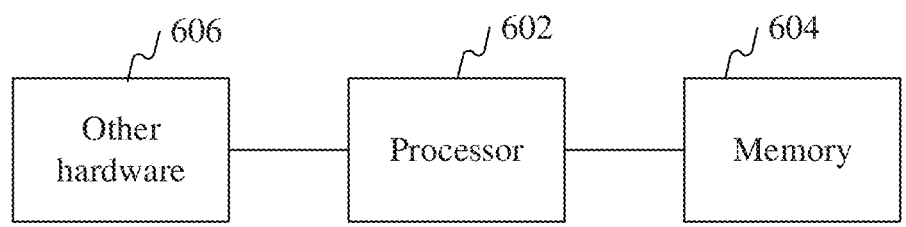
FIG. 6 is a block diagram of a dialog generation device according to an embodiment.

FIG. 6 is a block diagram of a dialog generation device 600, according to an embodiment. The device 600 may be a server or a terminal, such as a mobile phone, a tablet computer, a smart wearable device, an on-board computer, a personal computer, a medium computer, a computer cluster, and the like. The device 600 may include a processor 602, a memory 604, and other hardware 606, such as a chip for transmitting and receiving wireless signals, a board card for implementing a network communication interface, an input/output interface, etc.

The processor 602 may include one or more dedicated processing units, application-specific integrated circuits (ASICs), field-programmable gate arrays (FPGAs), or various other types of processors or processing units. The processor 602 is coupled with the memory 604 and is configured to execute instructions stored in the memory 604 to perform the above described methods.

The memory 604 may include a permanent memory, a non-permanent memory, a random access memory (RAM) and/or a non-volatile memory (such as a read-only memory (ROM) or a flash memory (flash RAM)), etc. The memory 604 stores an instruction executable by the processor 602, and when executed by the processor 602, the instruction causes the device 600 to: train a seq2seq-based dialog model using a loss function including topic range constraint information; and generate a dialog using the trained dialog model.

In some embodiments, there is provided a computer program product, such as a non-transitory computer-readable storage medium having computer-readable program instructions thereon for causing a processor to carry out the above-described methods.

The apparatus, device, and non-transitory computer storage medium correspond to the methods, and also have beneficial technical effects similar to those in the corresponding methods, as described above.

Each of the above described methods, modules, and units may be implemented as software, or hardware, or a combination of software and hardware. For example, a Programmable Logic Device (PLD) (for example, a Field Programmable Gate Array (FPGA)) is an integrated circuit, and logic functions thereof are determined by a user programming device. Designers program by themselves to integrate a digital system into a PLD, without having a chip manufacturer to design and manufacture a dedicated integrated circuit chip. Moreover, at present, the programming is mostly implemented by using logic compiler software, instead of manually manufacturing an integrated circuit chip. The software is similar to a software complier for developing and writing a program, and original codes before compiling also need to be written in a specific programming language, which is referred to as a Hardware Description Language (HDL). There are not just one, but many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art will know that a hardware circuit for implementing the logic method procedure may be easily obtained only by slightly logically programming the method procedure using the above several hardware description languages and programming the method procedure into an integrated circuit.

A controller may be implemented in any suitable manner in the above described devices. For example, the controller may be in the form of a microprocessor or a processor and a computer-readable medium storing computer-readable program codes (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of control logic of a memory. Those skilled in the art also know that, in addition to implementing the controller by using pure computer-readable program codes, the method steps may be logically programmed to enable the controller to implement the same function in the form of a logic gate, a switch, an application specific integrated circuit, a programmable logic controller and an embedded microcontroller. Therefore, such a controller may be considered as a hardware component, and apparatuses included therein and configured to implement various functions may also be considered as structures inside the hardware component. Alternatively, further, the apparatuses configured to implement various functions may be considered as both software modules for implementing the method and structures inside the hardware component.

The device, apparatus, module or unit illustrated in the foregoing embodiments can be implemented by a computer chip or an entity, or implemented by a product having a specific function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

For ease of description, the apparatus is divided into various modules based on functions, and the modules are described separately. In an embodiment, functions of the various modules can also be implemented in one or more pieces of software and/or hardware.

Those skilled in the art should understand that the embodiments of the specification may be provided as a method, a device, or a computer program product. Therefore, the embodiments may be implemented in a form of a complete hardware embodiment, a complete software embodiment, or an embodiment combining software and hardware.

Some embodiments are described with reference to flowcharts and/or block diagrams of the method, device (system) and computer program product. It should be understood that a computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of another programmable data processing device to generate a machine, so that the instructions executed by the computer or the processor of another programmable data processing device generate an apparatus configured to implement a specified function in one or more processes in the flowcharts and/or in one or more blocks in the block diagrams.

These computer program instructions may also be stored in a computer-readable memory that can guide a computer or another programmable data processing device to work in a particular manner, such that the instructions stored in the computer-readable memory generate an article of manufacture that includes an instruction apparatus. The instruction apparatus implements a function specified in one or more processes in the flowcharts and/or in one or more blocks in the block diagrams.

These computer program instructions may also be loaded onto a computer or another programmable data processing device, such that a series of operation steps are performed on the computer or another programmable device, thus generating computer-implemented processing. Therefore, the instructions executed on the computer or another programmable device provide steps for implementing a function specified in one or more processes in the flowcharts and/or in one or more blocks in the block diagrams.

The computer-readable storage medium may include permanent and non-permanent media as well as movable and non-movable media, and may implement information storage by means of any method or technology. The information may be a computer-readable instruction, a data structure, and a module of a program or other data. Examples of the computer-readable storage medium include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition in this specification, the computer-readable medium does not include transitory media, such as a modulated data signal and a carrier.

It should be further noted that the terms "include," "comprise" or other variations thereof are intended to cover non-exclusive inclusion, so that a process, method, article or device including a series of elements not only includes the elements, but also includes other elements not clearly listed, or further includes elements inherent to the process, method, article or device. In the absence of more limitations, an element defined by "including a/an . . . " does not exclude that the process, method, article or device including the element further has other identical elements.

The above described methods may be implemented by instructions executed by a computer, for example, a program module. Generally, the program module includes a routine, a program, an object, an assembly, a data structure, and the like for executing a specific task or implementing a specific abstract data type. The above described methods may also be implemented in distributed computing environments. In the distributed computing environments, a task is executed by remote processing devices connected through a communications network. In the distributed computing environments, the program module may be located in local and remote computer storage media including a storage device.

Although the specification has been described in conjunction with specific embodiments, many alternatives, modifications and variations will be apparent to those skilled in the art. Accordingly, the following claims embrace all such alternatives, modifications and variations that fall within the terms of the claims.

The invention claimed is:

1. A dialog generation method, comprising:
training a topic model using a dialog training corpus to obtain multiple first topic vectors, each of the multiple first topic vectors representing a topic;
training a sequence to sequence (seq2seq)-based dialog model based on the trained topic model and a loss function comprising topic range constraint information; and
generating a dialog using the trained dialog model,
wherein the training the seq2seq-based dialog model comprises:
inputting a training sequence into the seq2seq-based dialog model for processing to obtain various hidden-state output data output during the processing and an output sequence obtained after the processing;
generating a second topic vector corresponding to the output sequence according to the various hidden-state output data;
inputting the output sequence into the trained topic model for processing to obtain a first topic vector corresponding to the output sequence among the multiple first topic vectors;
calculating a loss using the loss function comprising topic range constraint information according to the first and second topic vectors corresponding to the output sequence; and
adjusting the dialog model according to the loss.

2. The method of claim 1, wherein the generating a second topic vector corresponding to the output sequence according to the various hidden-state output data comprises:
pooling the various hidden-state output data; and inputting data obtained after the pooling into a multi-layer perceptron for processing to generate the second topic vector corresponding to the output sequence.

3. The method of claim 1, wherein the calculating a loss using the loss function comprising topic range constraint information according to the first and second topic vectors corresponding to the output sequence comprises:
calculating a first similarity between the second topic vector corresponding to the output sequence and the first topic vector corresponding to the output sequence;
calculating a second similarity between the second topic vector corresponding to the output sequence and an irrelevant topic vector, wherein the irrelevant topic vector is a vector in the multiple first topic vectors other than the first topic vector corresponding to the output sequence; and
substituting the first similarity and the second similarity into the loss function comprising topic range constraint information to calculate the loss, wherein the topic range constraint information is a formula comprising parameters corresponding to the first similarity and the second similarity.

4. A dialog generation device, comprising:
a processor; and
a memory for storing instructions executable by the processor;
wherein the processor is configured to:
train a topic model using a dialog training corpus to obtain multiple first topic vectors, each of the multiple first topic vectors representing a topic;
train a sequence to sequence (seq2seq)-based dialog model based on the trained topic model and a loss function comprising topic range constraint information; and
generate a dialog using the trained dialog model,
wherein in training the seq2seq-based dialog model, the processor is further configured to:
input a training sequence into the seq2seq-based dialog model for processing to obtain various hidden-state output data output during the processing and an output sequence obtained after the processing;
generate a second topic vector corresponding to the output sequence according to the various hidden-state output data;
input the output sequence into the trained topic model for processing to obtain a first topic vector corresponding to the output sequence among the multiple first topic vectors;
calculate a loss using the loss function comprising topic range constraint information according to the first and second topic vectors corresponding to the output sequence; and
adjust the dialog model according to the loss.

5. The device of claim 4, wherein in generating a second topic vector corresponding to the output sequence according to the various hidden-state output data, the processor is further configured to:
pool the various hidden-state output data; and
input data obtained after the pooling into a multi-layer perceptron for processing to generate the second topic vector corresponding to the output sequence.

6. The device of claim 4, wherein in calculating the loss using the loss function comprising topic range constraint information according to the first and second topic vectors corresponding to the output sequence, the processor is further configured to:
calculate a first similarity between the second topic vector corresponding to the output sequence and the first topic vector corresponding to the output sequence;
calculate a second similarity between the second topic vector corresponding to the output sequence and an irrelevant topic vector, wherein the irrelevant topic vector is a vector in the multiple first topic vectors other than the first topic vector corresponding to the output sequence; and
substitute the first similarity and the second similarity into the loss function comprising topic range constraint information to calculate the loss, wherein the topic range constraint information is a formula comprising parameters corresponding to the first similarity and the second similarity.

7. A non-transitory computer-readable storage medium having stored therein instructions that, when executed by a processor of a device, cause the device to perform a dialog generation method, the method comprising:
training a topic model using a dialog training corpus to obtain multiple first topic vectors, each of the multiple first topic vectors representing a topic;
training a sequence to sequence (seq2seq)-based dialog model based on the trained topic model and a loss function comprising topic range constraint information; and
generating a dialog using the trained dialog model,
wherein the training the seq2seq-based dialog model comprises:
inputting a training sequence into the seq2seq-based dialog model for processing to obtain various hidden-state output data output during the processing and an output sequence obtained after the processing;
generating a second topic vector corresponding to the output sequence according to the various hidden-state output data;
inputting the output sequence into the trained topic model for processing to obtain a first topic vector corresponding to the output sequence among the multiple first topic vectors;
calculating a loss using the loss function comprising topic range constraint information according to the first and second topic vectors corresponding to the output sequence; and
adjusting the dialog model according to the loss.

8. The non-transitory computer-readable storage medium of claim 7, wherein the generating a second topic vector corresponding to the output sequence according to the various hidden-state output data comprises:
pooling the various hidden-state output data; and
inputting data obtained after the pooling into a multi-layer perceptron for processing to generate the second topic vector corresponding to the output sequence.

9. The non-transitory computer-readable storage medium of claim 7, wherein the calculating a loss using the loss function comprising topic range constraint information according to the first and second topic vectors corresponding to the output sequence comprises:
calculating a first similarity between the second topic vector corresponding to the output sequence and the first topic vector corresponding to the output sequence;
calculating a second similarity between the second topic vector corresponding to the output sequence and an irrelevant topic vector, wherein the irrelevant topic vector is a vector in the multiple first topic vectors other than the first topic vector corresponding to the output sequence; and substituting the first similarity and the second similarity into the loss function comprising topic range constraint information to calculate the loss, wherein the topic range constraint information is a formula comprising parameters corresponding to the first similarity and the second similarity.

* * * * *